(12) United States Patent
Oroskar et al.

(10) Patent No.: US 8,355,740 B1
(45) Date of Patent: *Jan. 15, 2013

(54) DYNAMIC PAGING CONCATENATION

(75) Inventors: Siddharth S. Oroskar, Overland Park, KS (US); Sachin R. Vargantwar, Overland Park, KS (US); Deveshkumar N. Rai, Overland Park, KS (US); Debasish Sarkar, Irvine, CA (US)

(73) Assignee: Sprint Spectrum L.P., Overland Park, KS (US)

( * ) Notice: Subject to any disclaimer, the term of this patent is extended or adjusted under 35 U.S.C. 154(b) by 677 days.

This patent is subject to a terminal disclaimer.

(21) Appl. No.: 12/558,359

(22) Filed: Sep. 11, 2009

(51) Int. Cl.
  *H04W 68/00* (2009.01)

(52) U.S. Cl. ...... 455/458; 455/466; 455/412.1; 455/502; 455/406; 455/425; 455/423; 370/389; 370/352; 370/486; 370/376; 370/400; 370/353

(58) Field of Classification Search .......... 455/466, 455/46.1, 458, 412.1, 502, 406, 445, 423; 370/389, 352, 486, 376, 353, 400
See application file for complete search history.

(56) References Cited

U.S. PATENT DOCUMENTS

| | | | |
|---|---|---|---|
| 5,369,681 A | 11/1994 | Boudreau et al. | |
| 5,889,783 A * | 3/1999 | Maloney et al. | 714/701 |
| 6,181,945 B1 | 1/2001 | Lee | |
| 6,687,339 B2 * | 2/2004 | Martin | 379/88.14 |
| 6,745,039 B1 | 6/2004 | Di Lalla | |
| 7,366,526 B2 | 4/2008 | Zhang et al. | |
| 2006/0251033 A1 | 11/2006 | Oprescu-Surcobe et al. | |
| 2007/0202849 A1 * | 8/2007 | Moeller | 455/412.1 |
| 2007/0233323 A1 * | 10/2007 | Wiemeyer et al. | 700/276 |
| 2008/0032713 A1 | 2/2008 | Yang | |
| 2008/0096520 A1 | 4/2008 | Benco et al. | |
| 2008/0293437 A1 | 11/2008 | Ranganathan et al. | |
| 2009/0106798 A1 * | 4/2009 | Nabatani et al. | 725/46 |
| 2009/0181701 A1 * | 7/2009 | Willey et al. | 455/458 |

OTHER PUBLICATIONS

Unpublished U.S. Appl. No. 12/553,661, filed Sep. 3, 2009 entitled "Method and System for Paging A Mobile Station".
Cai et al., "Mitigating DoS Attacks on the Paging Channel by Efficient Encoding in Page Messages," Computer Science Department.

* cited by examiner

*Primary Examiner* — Joseph Arevalo

(57) ABSTRACT

Disclosed herein are methods and systems for dynamically selecting a paging-concatenation level for a page based on one or more properties of the page. An exemplary method involves, at a wireless communication network that is configured to provide service to at least one wireless-communication device, using at least one property of a page record as a basis for selecting a paging-concatenation level for the page record, and paging the wireless-communication device by transmitting a page message that includes the page record, wherein the page message is of the selected paging-concatenation level. Various properties of the page record, such as the paging-attempt status and/or the target mobile station of the page, among others, may be used to select the paging-concatenation level.

15 Claims, 6 Drawing Sheets

DYNAMIC PAGING CONCATENATION

BACKGROUND

In a typical cellular wireless communication system, an area is divided geographically into a number of cells and cell sectors, each defined by a radio frequency (RF) radiation pattern from a respective base station antenna. The base station antennae in the cells may then be coupled with a base station controller, which may then be coupled with a switch or gateway that provides connectivity with a transport network such as the public switched telephone network (PSTN) or the Internet. When a mobile station, such as a cellular telephone, pager, or wirelessly-equipped computer, is positioned in a cell, the mobile station communicates via an RF air interface with the base station antennae of a cell. Consequently, a communication path can be established between the mobile station and the transport network, via the air interface, the base station, the base station controller, and the switch or gateway.

Further, in some wireless communication systems, multiple base stations are connected with a common base station controller, and multiple base stations are connected with a common switch or gateway. Each base station controller may then manage air interface resources for multiple wireless coverage areas (e.g., multiple cells and sectors), by performing functions such as assigning air interface traffic channels for use by mobile stations in the coverage areas and orchestrating handoff of calls between coverage areas. In turn, a switch and/or gateway may control one or more base station controllers and generally control wireless communications, by performing functions such as receiving and processing call requests, instructing base station controllers when to assign traffic channels, paging mobile stations, and managing handoff of calls between base station controllers.

In general, air interface communications in each sector (or other such coverage area) of a cellular wireless communication system can be encoded or carried in a manner that distinguishes the communications in that sector from communications in adjacent sectors. For example, in a Code Division Multiple Access (CDMA) system, each sector has a respective pseudo-random noise offset or "PN offset" that is used to encode or modulate air interface communications in the sector distinctly from those in adjacent sectors. Analogously, in other air interface protocols, communications in one sector may be distinguished from those in other sectors by frequency, time, and/or various other parameters.

Each sector may define an air interface "access channel" on which mobile stations can send "access probes" seeking to originate calls (e.g., voice calls, data sessions, and/or other "calls") or seeking to register their presence in the sector. From the viewpoint of the mobile station receiving the call (i.e., to which the access probe is directed), the call may be referred to as an "incoming call".

Further, each sector may define an air interface "paging channel" on which the serving base station can page a mobile station. For example, paging channel may be used to send access probe acknowledgements and traffic channel assignment messages to served mobile stations. The paging channel also defines timeslots in which the base station can send various messages to particular mobile stations. For instance, if an access probe is received from one mobile station seeking to connect to a second mobile station, the base station may send a page via the paging channel to notify the second mobile station of the incoming call. If a base station has numerous such messages to send, however, the paging channel can become congested, which may delay call setup or even result in a page not reaching the intended mobile station.

When a cellular wireless communication system seeks to page a mobile station (e.g., for an incoming call or for some other reason), a switch in the network may send the page message to numerous base stations in the switch's coverage area, with the hope that when the base stations broadcast the page message, the mobile station will receive the page message in one of the associated sectors, and will respond. Given the scarcity of paging channel resources, however, most modern cellular networks are instead arranged to engage in a more targeted paging process known as "zone based paging."

With zone based paging, a cellular network is divided into paging zones, each with a respective zone ID, and paging is performed on a zone-basis. To facilitate this, each base station in the system may broadcast as one of its overhead parameters the zone ID for the zone in which the base station is located. Mobile stations operating in the network may then programmatically monitor the zone IDs indicated in the overhead messages and may automatically register with the network when they detect that they have moved into a new zone, or for other reasons. To register with the network, a mobile station may send a registration message via the access channel in its current sector, and a switch in the network would note the mobile station's registration and convey an indication of the registration to a home location register for later reference.

With this process, the registration records thereby maintained by switches and/or home location registers will indicate the paging zone in which each mobile station last registered. When a switch seeks to page a mobile station, the switch may then efficiently send the page message to just those base stations that are within the zone of the mobile station's last registration, as it is likely that the mobile station is in that zone. Further, the switch may send the page message to the base stations in zones adjacent to the mobile station's zone of last registration, to cover the possibility that the mobile station has moved to a new zone but has not yet registered its presence in the new zone. Once the designated base stations transmit the page message, if the mobile station does not respond to the page, the switch may then broaden the scope of the page, by sending the page message to a wider range of paging zones and perhaps ultimately to all base stations in the switch's serving area.

Using the general paging strategy that is implemented in many wireless access networks, the network may make up to three attempts to page a mobile station. In particular, the network may first attempt to transmit a page record in the paging zone in which the mobile station is registered (i.e., the base stations in the paging zone in which the mobile station is registered transmit the page record). Then, if the first attempt is unsuccessful (i.e., the mobile station does not acknowledge the page record), the network makes a second attempt to page the mobile station by again transmitting the page record in the paging zone in which the mobile station is registered, and possibly in adjacent zones as well. If the second attempt also fails, then the network makes a third attempt to page the mobile station, which typically involves a system-wide transmission of the page record (i.e., in all paging zones), although it is possible that a third attempt may be of a different scope as well.

OVERVIEW

According to an exemplary embodiment, a network may page a mobile station by transmitting page records in page messages that employ varying levels of concatenation, depending upon a certain property or certain properties of the page. As such, an exemplary method may be used to dynamically select a concatenation level with which to send each page. For example, a wireless communication network may select the paging-concatenation level for a given page based on a paging-attempt status of the page (e.g., whether it is the first, second, or third attempt to transmit a page record to a mobile station). As another example, a network may select the paging-concatenation level for a given page based on the type of mobile station to which the page record is being sent. The network may then transmit the page by including the page record in a page message having the selected paging-concatenation level.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION

Figure 1:
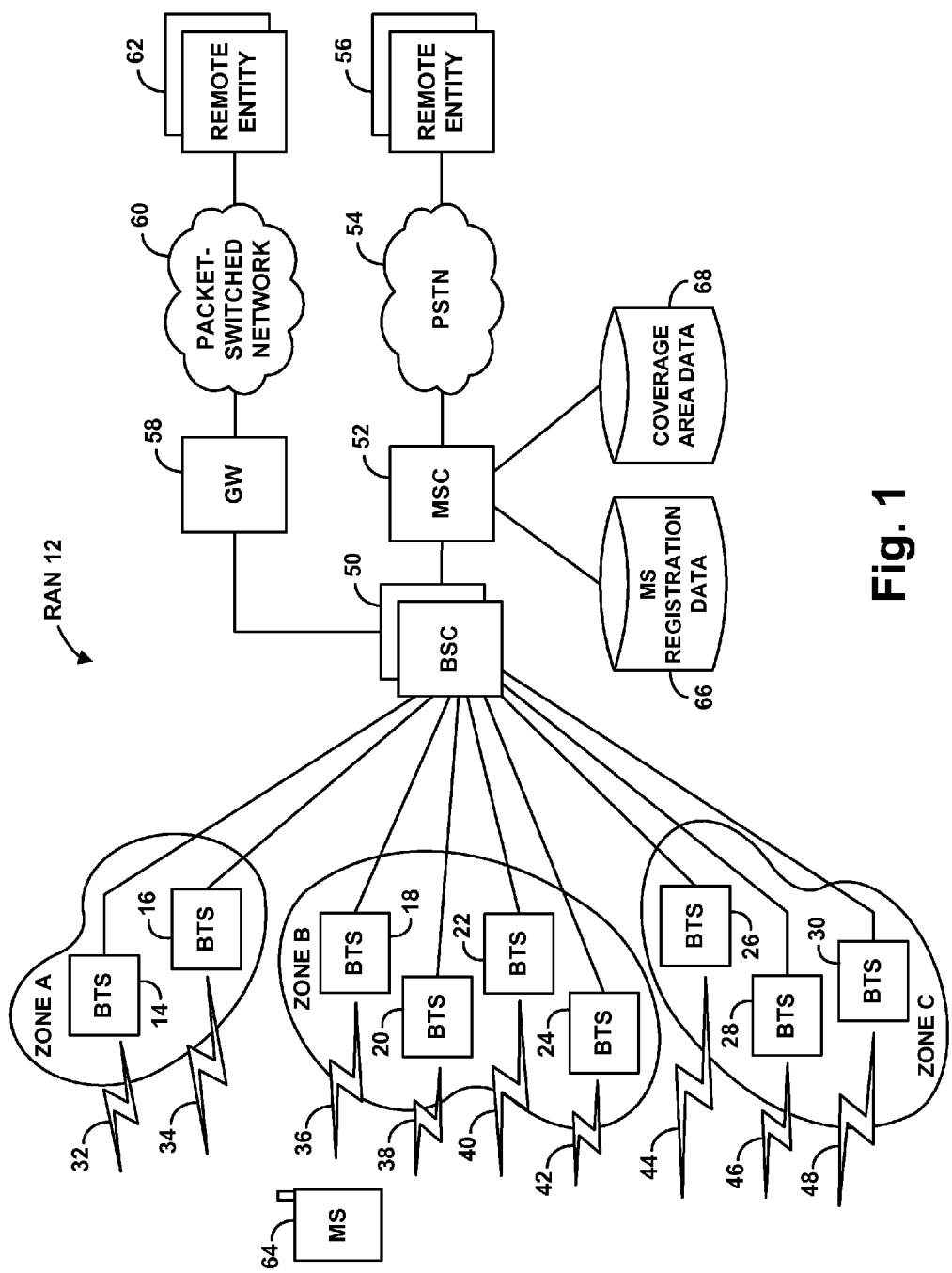
FIG. 1 is a simplified block diagram of a wireless communication network, according to an exemplary embodiment.

Referring to the drawings, as noted above, FIG. 1 is a simplified block diagram of a wireless communication network in which the present method can be implemented. It should be understood, however, that this and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. In addition, various functions described herein as being performed by one or more entities may be carried out by hardware, firmware, and/or software. For instance, various functions may be carried out by a processor executing program instructions stored in memory or another machine-readable medium (i.e., data storage, rather than a mere signal), to achieve the useful, concrete, and tangible result of helping to avoid or reduce the likelihood of blocked calls.

As shown in FIG. 1, the exemplary network includes at its core a radio access network (RAN) 12 that radiates to define numerous coverage areas in which mobile stations can engage in RF communication with the RAN. The RAN may define these coverage areas discretely through use of directional antennas and/or by various modulation parameters, including, without limitation, carrier frequencies and PN offsets or other parameters, depending on the air interface protocol used. Example air interface protocols include CDMA (e.g., IS-95, IS-2000, 1xRTT, 1xEV-DO, etc.), iDEN, WiMAX, TDMA, AMPS, GSM, GPRS, UMTS, EDGE, LTE, WI-FI (e.g., 802.11), BLUETOOTH, and others now known or later developed. In practice, the coverage areas may overlap to some extent, so that a served mobile station can move seamlessly from one coverage area to another.

The RAN can take various forms and may include any of a variety and number of components, depending for instance on the air interface protocol employed by the RAN. As such, the RAN may vary in degree of complexity, from a simple wireless access point router to a more complex system such as that shown for instance.

As shown, the RAN may include numerous base stations (also known as base transceiver stations or BTSs), designated in the figure as base stations 14-30 and one or more base station controllers 50 (which may be integrated with one or more of the base stations). The base stations preferably include directional antennas, power amplifiers, and associated transceiver equipment arranged to establish corresponding wireless coverage areas 32-48 as shown and to communicate with mobile stations in those coverage areas.

The coverage areas shown in the figure can be cell sites, cell sectors, or some other defined wireless coverage area (possibly even a combination of coverage provided by multiple base stations). For simplicity, just a single coverage area is shown emanating from each base station, but it is further understood that a typical base station may provide multiple discrete coverage areas, such as multiple cell sectors for instance.

Each base station controller may be coupled with one or more switches, such as a mobile switching center (MSC) 52, which provides connectivity with the public switched telephone network (PSTN) 54, so that served mobile stations can communicate with remote entities 56 on the PTSN. Additionally or alternatively, each base station controller may be coupled with one or more gateways, such as packet data serving node (PDSN) 58, which provides connectivity with a packet-switched network 60, so that served mobile stations can communicate with remote entities 62 on the packet-switched network.

FIG. 1 depicts a representative mobile station 64 by way of example, which could be a cell phone, wirelessly equipped personal digital assistant (PDA), or any other type of wirelessly-equipped device now known or later developed. The mobile station is preferably equipped with hardware, software, and/or other logic to communicate with RAN 12 in accordance with an agreed communication protocol, such as one of the protocols noted above for instance. For example, in an exemplary embodiment, mobile station 64 includes a wireless communication interface that functions to facilitate air interface communication with RAN 12 according to one or more protocols such as those noted above. Further, mobile station may include a user interface, which typically includes components for receiving input from a user of mobile station and providing output to a user of the mobile station. Yet further, mobile station 64 may include program logic stored in data storage (e.g., one or more volatile and/or non-volatile storage components of the mobile station, such as magnetic, optical, or organic storage components) and executable by one or more processors (e.g., general purpose and/or special purpose processors) to carry out various functions described herein.

Further, FIG. 1 depicts the base stations grouped into zones A, B, and C, to facilitate zone-based paging as described above. As described above, each base station may broadcast a zone ID indicating its zone, and a mobile station such as mobile station 64 may monitor the zone IDs broadcast in the coverage areas where the mobile station is operating. When the mobile station detects a change in zone ID, the mobile station may then responsively register its presence in the new zone, so that the RAN would then know to page the mobile station in that new zone.

In an exemplary embodiment, zones are defined by MSCs (i.e., zone IDs are created, base stations are assigned to a particular zone ID, etc.). For instance, MSC 52 may create zone IDs corresponding to each zone A-C, and assign base stations 14-16 to zone A, base stations 18-24 to zone B, and base stations 26-30 to zone C. It should be understood, however, that other network entities may define paging zones, in combination with or instead of MSC 52, without departing from the scope of the invention.

As shown, MSC 52 also includes or has access to mobile station registration data 66. The mobile station registration data 66 preferably comprises data that specifies per mobile station where the mobile station is currently registered, such as the zone in which the mobile station is currently registered, among possibly other information. More specifically, the mobile station registration data 66 may take the form of a visitor location register (VLR) database, which holds a record per mobile station in the MSC's service area. The mobile station's current zone of registration can thus be indicated in the mobile station's VLR record. Alternatively or additionally, the mobile station registration data can take the form of a home location register (HLR) database 70 that is accessible via the MSC 52. Still alternatively, the data may be stored internally at the MSC or elsewhere in some other form.

Each mobile station, such as mobile station 64, typically has at least one associated identifier that uniquely identifies the mobile station. By way of example, a mobile station may have a unique mobile directory number (MDN), a unique International Mobile Subscriber Identity (IMSI), a unique MAC address, or some other identifier dynamically or statically assigned to the mobile station, which may serve as its address for receiving air interface communications transmitted to it by the RAN. As a specific example, an IMSI is a unique number associated with the mobile station, typically taking the form of the mobile station's phone number. Additionally or alternatively, each mobile station may be assigned a mobile identification number (MIN).

In a further aspect, each mobile station typically has a service profile stored in the HLR 70. Each MSC 52 is in turn coupled with the HLR 70, typically by an out of band signaling network such as a Signaling System #7 (SS7) network for instance, and may thus access the service profile for a mobile station using an identifier for the mobile station, such as its MIN, MDN, and/or IMSI.

Figure 2:
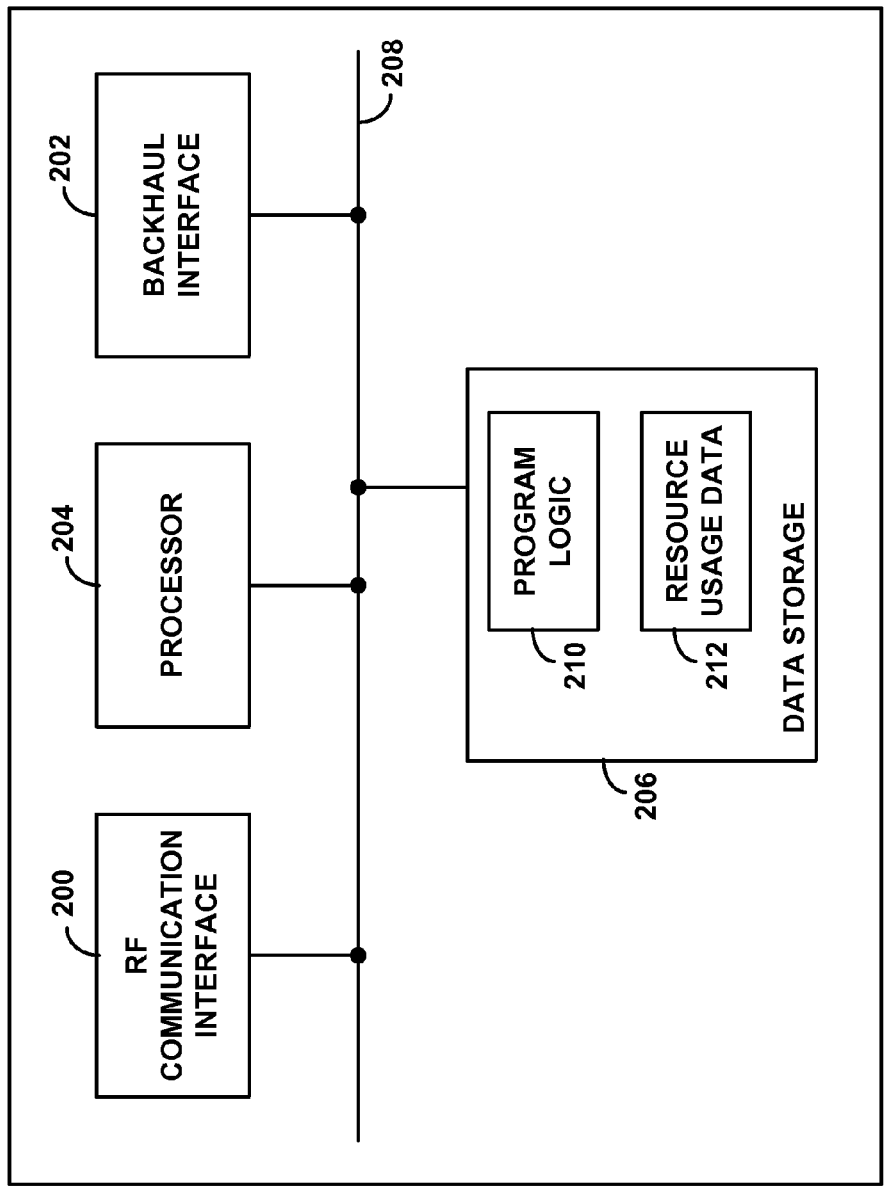
FIG. 2 is a simplified block diagram showing functional components of a base station, according to an exemplary embodiment.

FIG. 2 is a simplified block diagram showing functional components of an exemplary base station (or any other entity arranged to carry out analogous functions). As shown, the base station includes an RF communication interface 200, a backhaul interface 202, a processor 204, and data storage 206, all of which may be communicatively linked together by a system bus, network, or one or more other connection mechanisms 208.

RF communication interface 200 may comprise one or more antenna structures, one or more power amplifiers, and associated equipment, for engaging in RF communication with mobile stations operating within the base station's coverage, according to one of the air interface protocols noted above for instance. Backhaul interface 202 may comprise any sort of communication link or mechanism enabling the base station to exchange signaling and bearer data with other RAN entities such as with BSC 50, or via BSC 50 with MSC 52 for instance. Processor 204 may comprise one or more processors (e.g., general purpose and/or special purpose processors), such as microprocessors for instance. And data storage 206 may comprise one or more volatile and/or non-volatile storage components, such as magnetic, optical, or organic storage components, integrated in whole or in part with processor 204.

As further shown, data storage 206 preferably contains program logic (e.g., machine language instructions) 210 executable by processor 204 to carry out various base station functions described herein. Further, data storage 206 preferably contains or can contain resource usage data 212, such as data indicating total resources, current resource usage, and thus the extent to which resources are or are not currently available, on a sector by sector basis, and data indicating whether each of one or more coverage areas of the base station is currently experiencing threshold congestion in terms of any or all of the resources noted above and/or other resources.

Figure 3:
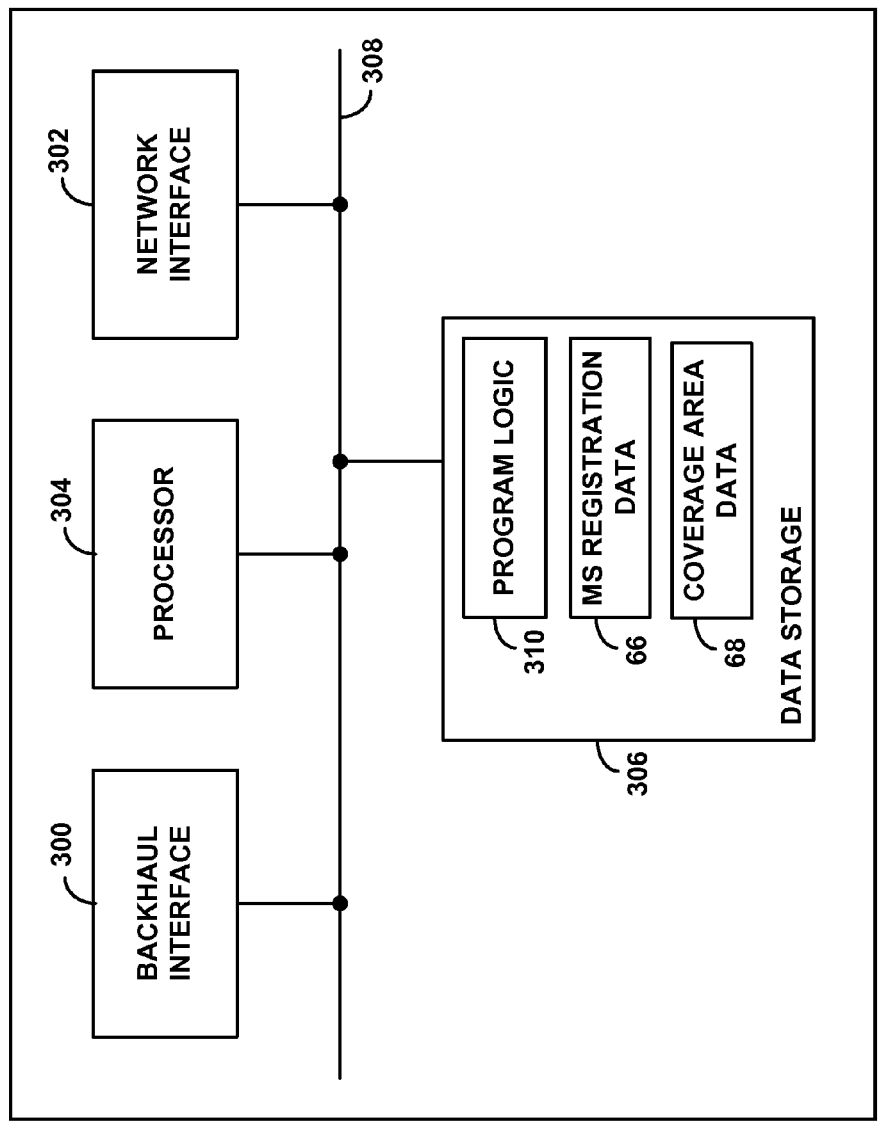
FIG. 3 is next a simplified block diagram showing functional components of a mobile switching center, according to an exemplary embodiment.

FIG. 3 is next a simplified block diagram showing functional components of an exemplary MSC such as MSC 52 for instance, or any other entity arranged to carry out analogous functions. As shown, the MSC includes a backhaul interface 300, a network interface 302, a processor 304, and data storage 306, all of which may be communicatively linked together by a system bus, network, or one or more other connection mechanisms 308.

Backhaul interface 300 may comprise any sort of communication link or mechanism enabling the MSC to exchange signaling and bearer data with other RAN entities such as with BSC 50, or via BSC 50 with various base stations for instance. Network interface 302 may comprise any sort of interface enabling MSC 52 to exchange signaling and bearer data for PSTN communication and perhaps to access mobile station registration data 66 and/or coverage data 68 if the data is accessible in that manner.

Processor 304 may comprise one or more processors (e.g., general purpose and/or special purpose processors), such as microprocessors for instance. And data storage 306 may comprise one or more volatile and/or non-volatile storage components, such as magnetic, optical, or organic storage components, integrated in whole or in part with processor 304.

As further shown, data storage 306 preferably contains program logic (e.g., machine language instructions) 310 executable by processor 304 to carry out various MSC functions described herein. Further, data storage 306 may contain the mobile station registration data 66 and/or the coverage area data 68, such as a copy of part or all of that data, for convenient access by the MSC processor 304.

According to an exemplary embodiment, a wireless communication network, and in particular, an entity or combination of entities in the network such as a base station, BSC, and/or MSC, may be configured to page one or more mobile stations by transmitting a General Page Message (GPM) over one or more paging channels. It should be understood that actions that are generally described as being carried out by the wireless communication network (or simply by the "network") may be carried out by various different entities or combinations of entities in the network. Furthermore, actions described as being carried out by one network entity, such as an MSC or BSC, may also be carried out by other entities, such as a base station, without departing from the scope of the invention.

In an exemplary embodiment, a network will typically receive an indication that a mobile station should be paged (e.g., an incoming call), which includes an identifier of the mobile station, such as a MIN or IMSI. The base station may then use the MIN or IMSI as a basis to determine the carrier air interface (CAI) transmit address fields, and encode these fields into a page record, which may then be placed in a GPM for transmission in the zone in which the mobile station is registered (and possibly other zones as well). Additional details of this process are well known in the art, and thus not discussed in detail herein.

Further, an exemplary base station may be configured to create a page message that includes multiple page records, such that multiple mobile stations can be paged using a single page message. Furthermore, page records may be concatenated so that more page records may be included in a page message than otherwise could be. For example, in some implementations, at least eight page records may be concatenated in a single GPM. Alternatively, other implementations may define concatenation in which at least five page records may be included in a single GPM. Other concatenation techniques are also possible.

Without concatenation, a GPM, which occupies two half frames in the paging channel, typically cannot include more than four page records. In comparison, some implementations may provide for concatenation such that a GPM in which two page records are concatenated can be sent in two to three half frames, which allows for at least five page records to be sent in a single timeslot. Additionally or alternatively, some implementations may provide for a GPM in which two to eight page records can be concatenated and sent in two to eight half frames, which allows a base station to transmit at least eight page records in a timeslot.

Without concatenation, a GPM, which occupies two half frames in the paging channel, typically cannot include more than four page records. In comparison, FR4916 provides for concatenation such that a GPM in which two page records are concatenated can be sent in two to three half frames, which allows for at least five page records to be sent in a single timeslot. Subsequently, FR4916E has defined a GPM in which two to eight page records can be concatenated and sent in two to eight half frames, which allows a base station to transmit at least eight page records in a timeslot.

Concatenating page records into a GPM may reduce the load on the paging channel, thereby helping to reduce paging channel occupancy (PCO). When multiple page records are concatenated in a GPM, some information which is typically included in a page is not repeated for each page record. For example, length bits, overhead bits, CRC bits, and reserved bits, are not repeated for each page record in a GPM. However, there may be a performance tradeoff since more page records are being concatenated into the same 80 ms slot, and therefore, some page records may fail to reach their intended mobile stations, which reduces the paging-success rate. In practice, a two to three percent decrease in the paging success rate has been observed.

According to an exemplary embodiment, a network entity or entities, such as MSC 52 and/or one or more base stations, may be configured to vary the level of concatenation used for GPMs it transmits. In addition, the network may be configured to send a page record in a page message without concatenating the page record.

As such, an exemplary method may be used to dynamically select a paging-concatenation level for each page record, and then include the page record in a GPM having the selected paging-concatenation level. The present method may therefore help improve paging efficiency, by dynamically reducing or eliminating concatenation to improve chances that a page is received successfully, in a scenario where a page is less likely to be received, or has not been received in previous attempts.

Figure 4:
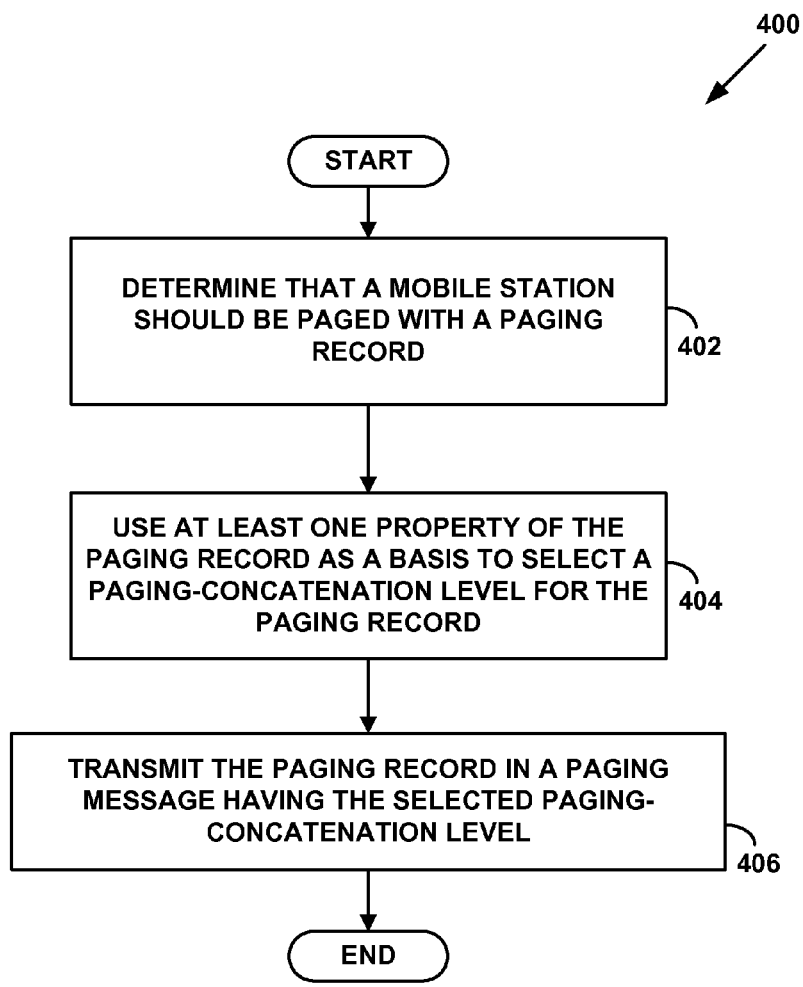
FIG. 4 is a flow chart depicting functions that can be carried out in accordance with an exemplary method.

FIG. 4 is a flow chart depicting functions that can be carried out in accordance with an exemplary method. The method 400 shown in FIG. 4 may be carried out to determine the paging-concatenation level to use in sending a page record. The method may be carried at a wireless communication network that is configured to provide service to at least one wireless-communication device, and more specifically, may be carried out by an entity or entities in the network.

An exemplary method may be initiated when a base station determines that a mobile station should be paged (i.e., that the mobile station should be sent a page record), as shown in block 402. The determination that a mobile station should be paged usually takes the form of an incoming call to the mobile station, although other forms are possible as well. After determining that a mobile station needs to be sent a page record, the method involves using at least one property of the page record as a basis for selecting a paging-concatenation level for the page record, as shown by block 404. Further, the method involves transmitting the page record to the mobile station in a page message having the selected paging-concatenation level, as shown by block 406.

Various properties of the page record may be used as the basis for selecting the paging-concatenation level for a given page record. In a first embodiment, when a page record is going to be sent to a mobile station, the network may determine the paging-attempt status of the page record The paging-attempt status may be an indicator of the number of previous unsuccessful attempts to transmit the page record (i.e., whether it is the first, second, or third attempt to send the page record). In a second embodiment, the network may select the paging-concatenation level based upon the mobile station to which the page record is being sent (also referred to herein as the "target mobile station"). Other properties of a page record may also be used to select the paging-concatenation level, either in conjunction with, or instead of, the paging-attempt status and/or the target mobile station of the page.

In an exemplary embodiment, the step of selecting a paging-concatenation level for the page record may be implemented by inserting the page record into a GPM having the selected level. For instance, the network may determine that a first page record should be concatenated such that up to eight page records may be included in a GPM, while a second page record should be concatenated such that up to five page records may be included in a GPM. Alternatively, the network may select a paging-concatenation level of zero (i.e., no concatenation), and thus include the page record in a page message without any concatenation.

Figure 5:
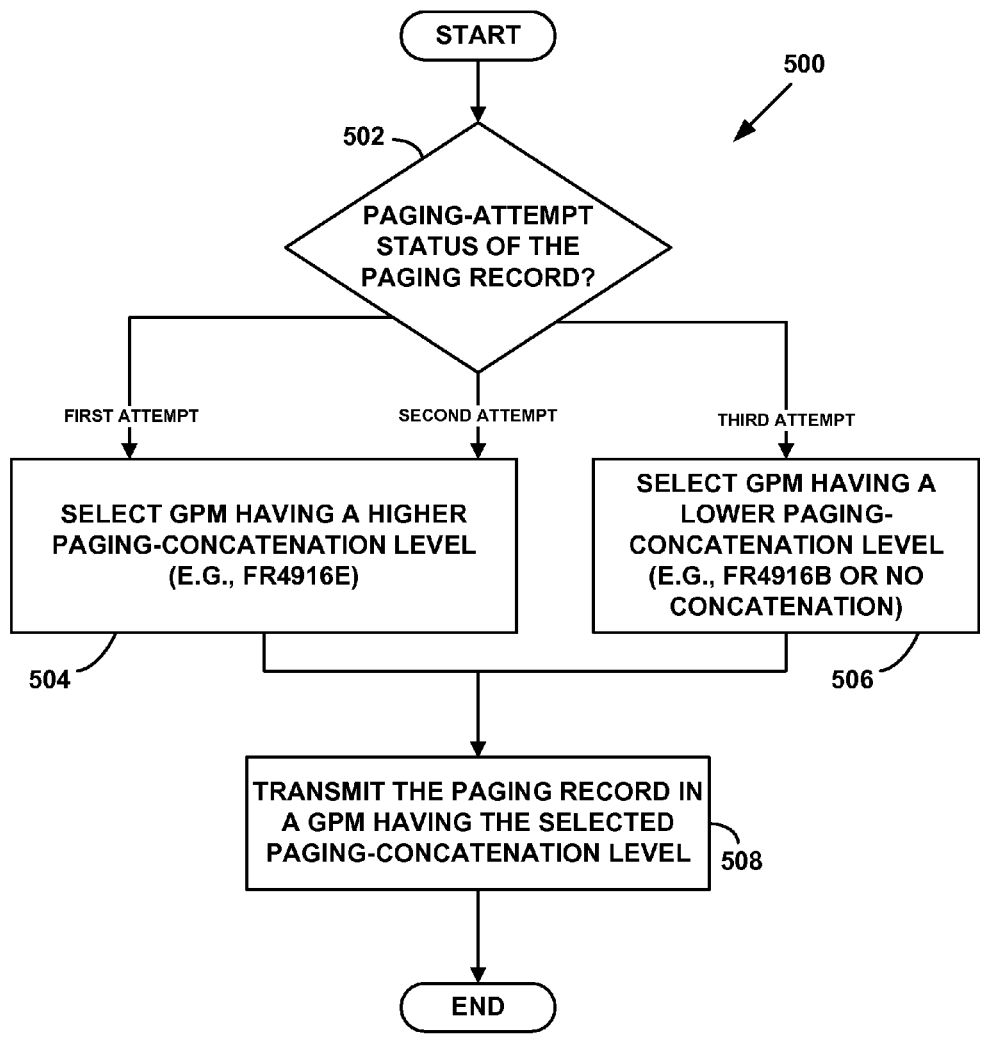
FIG. 5 is another flow chart depicting functions that can be carried out in accordance with an exemplary method.

FIG. 5 is another flow chart depicting functions that can be carried out in accordance with an exemplary method. The method 500 shown in FIG. 5 depicts an embodiment in which the paging-attempt status of a page record is used to select the paging-concatenation level for the page record. Further, method 500 may be carried out in a network that uses a general paging strategy, in which the network may make up to three attempts to page a mobile station before determining that the mobile station cannot be reached (i.e., that the page has failed or was unsuccessful). However, it should be understood that the network may also be implemented in a network configured for more or less page attempts, without departing from the scope of the invention. It should also be understood that an exemplary method may be carried out in a network that employs zone-based paging or another paging technique.

According to an exemplary embodiment, a network may perform the method 500 before or at the time of an attempt to page a mobile station. The method 500 involves the network determining the paging-attempt status of the page record, as shown by block 502. In particular, since up to three attempts to page a mobile station are possible, the paging attempt-status may take the form of a transmission-attempt number that indicates whether it is the first, second, or third attempt to page the mobile station. For example, if it is the first or second attempt to page the mobile station, the network may select a higher paging-concatenation level (i.e., the page record is inserted in a GPM that includes more page records). As shown by block 504, the network may include the page record in a GPM that concatenates page records such that up to eight page records may be included in a GPM. Alternatively, if it is the third attempt to page the mobile station, the base station selects a lower paging-concatenation level. For instance, the network may include the page record in a GPM such that up to five page records may be included in a GPM, as shown by block 506 (or possibly include the page record in a page message which does not concatenate the page record). The base station then transmits the page record in a GPM having the selected paging-concatenation level, as shown by block 508.

It should be understood that while FIG. 5 shows the same paging-concatenation level being selected for the first and second page attempts, different paging-concatenation levels may be selected for the first and second page attempts. For example, a page-concatenation level that allows for concatenation of up to eight page records in a GPM may be selected for the first attempt, whereas a page-concatenation level that allows for concatenation of up to five page records in a GPM may be selected for the second attempt. Further, the method may involve selecting the same paging-concatenation level for the third attempt, as is selected for the second or first attempt.

It should be understood that while FIG. 5 shows the same paging-concatenation level being selected for the first and second page attempts, different paging-concatenation levels may be selected for the first and second page attempts. For example, FR4916E (concatenating up to eight page records in a GPM) may be selected for the first attempt, whereas FR4916B or FR4916 (concatenating up to two page records in a GPM) may be selected for the second attempt. Further, the method may involve selecting the same paging-concatenation level for the third attempt, as is selected for the second or first attempt.

The network may be provided with information that facilitates determining the paging-attempt status of a given page. For example, to facilitate zone-based paging, switches in a wireless communication network, such as an MSC, typically include or have access to a database in which the paging-attempt status for each page (i.e., for each page record) is maintained. Accordingly, to determine paging-attempt status for a given page, the switch may simply access this database. Alternatively, if a base station is carrying out the method, the base station may query and receive the paging-attempt status from its serving MSC. As another alternative, a base station carrying out the method may itself include or have access to a database providing paging-attempt statuses, which may alleviate the need to query its serving MSC for the paging-attempt status. Other configurations and techniques for determining paging-attempt status are also possible.

Figure 6:
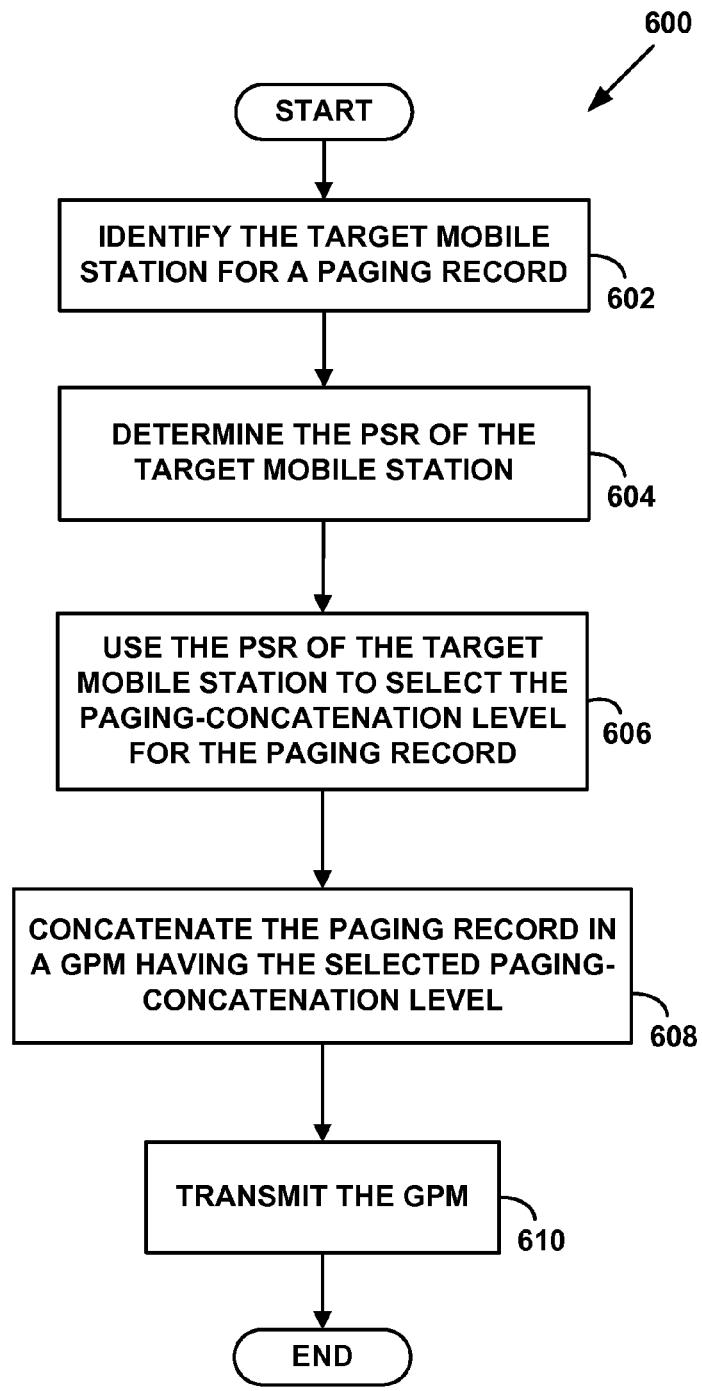
FIG. 6 is another flow chart depicting functions that can be carried out in accordance with an exemplary method.

FIG. 6 is another flow chart depicting functions that can be carried out in accordance with an exemplary method. The method 600 shown in FIG. 6 depicts an embodiment in which the selection of the paging-concatenation level for a page record is based upon the device to which the page record is being sent (i.e., the target mobile station), and in particular, upon a paging success rate (PSR) associated with the target mobile station. Specifically, before a base station transmits a page record, the base station may identify the device to which the page record is being sent (i.e., the target mobile station), as shown by block 602. The base station may then determine the paging success rate (PSR) that is associated with the target mobile station, as shown by block 604, and use the PSR of the target mobile station to select the paging-concatenation level for the page record, as shown by block 606. The network then inserts the page record, along with other page records for which the same paging-concatenation level is selected, into a GPM having the selected paging-concatenation level, as shown by block 608.

The network then transmits the GPM having the selected paging-concatenation level, as shown by block 610. Further, according to an exemplary embodiment, the network transmits the GPM in the paging zone in which the target mobile station is registered, and possibly in adjacent zones as well (depending upon the paging-attempt status of the page record). Yet further, in addition to using the PSR of the target mobile station, the selection of the paging-concatenation level may be further based upon the paging-attempt status (i.e., for a given PSR, the selected paging-concatenation level may vary depending upon the paging-attempt status).

For purposes of determining an associated PSR, a target mobile station may be classified in various ways. For example, a mobile station may be identified by its IMSI or MIN and accordingly, the network may determine the PSR that is associated with a particular IMSI or MIN. Alternatively, a mobile station may be identified as being a device of a particular type or class. For example, the network may be configured to use a certain paging-concatenation level for cellular phones, a certain paging-concatenation level for PDAs, a certain paging-concatenation level for laptop computers, and so on. As another example, the network may identify a mobile station by its model number and be configured to use a paging-concatenation level associated with the model number. Other examples are also possible.

Accordingly, an exemplary method may further involve maintaining historical PSR data for a plurality of mobile stations or by mobile station type or class. The historical PSR-data may be maintained in a PSR database, which may then be accessed to determine the PSR associated with various mobile stations. For example, a switch and/or base station may be configured to maintain and update the PSR data on a per-IMSI basis and/or a per-MIN basis. Accordingly, the network may be configured to maintain an entry for each IMSI and/or MIN in the PSR database. Specifically, to update the PSR database, the base station may determine, for each outgoing page record, the IMSI and/or MIN of the target mobile station. Then, after the page is either successful (i.e., a paging response message is received from the target mobile station) or unsuccessful, the PSR-database entry for the IMSI and/or MIN may be updated accordingly.

As another example, PSR data may be tracked and maintained on a per-mobile-station-model basis (i.e., by calculating and storing a PSR in a database entry for each model number). Accordingly, to update the PSR database, a base station and/or switch may determine the IMSI or MIN for the target mobile station of each outgoing page record. The base station may then determine the model number of the device registered to the IMSI or MIN using techniques that are well known in the art, such as by using the IMSI or MIN to access the service profile for the mobile station. Further, after the page is either successful (i.e., a paging response message is received from the target mobile station) or unsuccessful, the PSR database entry for the model number may be updated accordingly. The PSR may be tracked using other techniques as well, without departing from the scope of the invention.

The PSR data stored in the PSR database may take various forms. For example, the PSR is typically the percentage of pages to particular mobile station model, IMSI, MIN, class or type of mobile station, etc., that are successful. The percentage may be based on a predetermined number of pages, or a predetermined time period. Accordingly, the PSR may be the percentage of successful pages over predetermined number of previous pages or a previous time period. Other forms for the PSR data are also possible.

In an exemplary embodiment, the network typically selects a lower paging-concatenation level when a page record has a target mobile station with a lower PSR, whereas a higher PSR typically corresponds to selection of a higher paging-concatenation level. As a specific example, an exemplary method may employ two paging-concatenation levels (e.g., either a GPM using concatenation or a page message with no concatenation). Then, if the target mobile station has a PSR of less than 90%, the network will not concatenate the page record. On the other hand, if the target mobile station has a PSR of greater than 90%, then the base station may concatenate the page record. Other examples are also possible.

In a further aspect, ranges of possible PSRs may be defined, and each entry in the PSR database may specify a PSR range for a given mobile station or type of mobile station. For example, PSR ranges A, B, C, and D may be defined, with range A corresponding to a PSR of 95% to 100%, range B corresponding to a PSR of 80 to 95%, range C corresponding to a PSR of 60% to 80%, and range D corresponding to a PSR of less than 60%. The PSR for a given mobile station model, IMSI, MIN, etc. may be determined (and the PSR database may be updated accordingly) as described above, except that the entry will specify a range (e.g., A, B, C or D) corresponding to the PSR. It should be understood that the number of ranges and the bounds of each range vary as a matter of engineering design choice. The PSR range for a given database entry may be updated each time the PSR is updated (i.e., each time a paging request is determined to have been successful or unsuccessful). Alternatively, the PSR range may be updated periodically, each time a predetermined number of pages have occurred since the last update. Thus, the PSR range may change less frequently than the PSR itself.

When PSR ranges are identified in the PSR database, the step of using the PSR of the target mobile station to select the paging-concatenation level, shown in block 606, may involve using the PSR range of the target mobile station to select the paging-concatenation level for an outgoing page record. In particular, each PSR range may be assigned an associated paging-concatenation level. Accordingly, the network may query the PSR database with the model number of the target mobile station, the IMSI or MIN registered to the target mobile station, or another identifier associated with the target mobile station, in order to retrieve the PSR range. The network may then select the paging-concatenation level assigned for the PSR class.

Exemplary embodiments of the present invention have been described above. It should be understood the word "exemplary" is used herein to mean "serving as an example, instance, or illustration." Any embodiment described herein as "exemplary" is not necessarily to be construed as preferred or advantageous over other embodiments. In addition, those skilled in the art will understand that changes and modifications may be made to these exemplary embodiments without departing from the true scope and spirit of the invention, which is defined by the claims.

We claim:

1. A method for sending a page record, the method comprising:
    at a wireless communication network that is configured to provide service to at least one wireless-communication device, determining whether a transmission of a page record will be a first, second, or third attempt to transmit the page record;
    using at least one property of the page record as a basis for selecting a paging-concatenation level for the page record, wherein using the at least one property of the page record as a basis for selecting the paging-concatenation level comprises:
        if the transmission of the page record will be the first attempt, then selecting a first paging-concatenation level;
        if the transmission of the page record will be the second attempt, then selecting a second paging-concatenation level; and
        if the transmission of the page record will be the third attempt, then selecting a third paging-concatenation level; and
    paging the wireless-communication device by transmitting a page message that includes the page record, wherein the page message is of the selected paging-concatenation level.

2. The method of claim 1, further comprising making a determination that the wireless-communication device should be paged and responsive to the determination, performing the method of claim 1.

3. The method of claim 1, wherein the at least one property of the page record comprises a paging-attempt status of the page record.

4. The method of claim 3, wherein the wireless communication network is configured to make a plurality of attempts to transmit the page record when previous attempts to transmit the page record are unsuccessful, the method further comprising, determining the paging-attempt status of the page record.

5. The method of claim 1, wherein the page message that includes the page record is a general page message (GPM), and wherein the paging-concatenation level specifies an amount of concatenation that is applied to page records included in the GPM.

6. A method comprising:
    at a wireless communication network that is configured to provide service to at least one wireless-communication device, receiving an incoming communication for the wireless-communication device and responsively creating a page record in order to page the wireless-communication device;
    using at least one property of the page record as a basis for selecting a paging-concatenation level for the page record, wherein using the at least one property of the page record as the basis for selecting the paging-concatenation level comprises:
    based, at least in part, on the wireless-communication device that is being paged, selecting the paging-concatenation level by: (a) determining a paging success rate (PSR) associated with the wireless-communication device that is being paged and (b) using the PSR as the basis for selecting the paging-concatenation level for the page record; and
    paging the wireless-communication device by transmitting a page message that includes the page record, wherein the page message is of the selected paging-concatenation level.

7. A method comprising:
    at a wireless communication network that is configured to provide service to at least one wireless-communication device, receiving an incoming communication for the wireless-communication device and responsively creating a page record in order to page the wireless-communication device;

using at least one property of the page record as a basis for selecting a paging-concatenation level for the page record, wherein the selecting of the paging-concatenation level is based at least in part on the wireless-communication device that is being paged, and wherein using the at least one property of the page record as the basis for selecting the paging-concatenation level comprises:

using at least one of (a) a device type of the wireless-communication device and (b) an identifier of the wireless-communication device as the basis to select the paging-concatenation level; and paging the wireless-communication device by transmitting a page message that includes the page record, wherein the page message is of the selected paging-concatenation level.

8. The method of claim 7, wherein the device type comprises a model number of the wireless-communication device.

9. The method of claim 7, wherein the identifier of the wireless-communication device comprises at least one of (a) a Mobile Identification Number (MIN), (b) a mobile directory number (MDN), (c) an International Mobile Subscriber Identity (IMSI), and (d) a medium access control (MAC) address.

10. The method of claim 7, further comprising maintaining historical PSR-data on at least one of (a) a per-device type basis and (b) a per-identifier basis.

11. A system configured to page a mobile station, the system comprising:

at least one communication interface configured to communicate with a wireless-communication device;

at least one processor; and program instructions stored in data storage and executable by the at least one processor to determine that the wireless-communication device should be paged and responsively:

determine whether a transmission of a page record to the wireless-communication device will be a first, second, or third attempt to transmit the page record;

use at least one property of the page record as a basis to select a paging-concatenation level, wherein selection of the paging-concatenation level comprises:

if the transmission of the page record will be the first attempt, then selecting a first paging-concatenation level;

if the transmission of the page record will be the second attempt, then selecting a second paging-concatenation level; and if the transmission of the page record will be the third attempt, then selecting a third paging-concatenation level; and page the wireless-communication device by transmitting a page message that includes the page record, wherein the page message is of the selected paging-concatenation level.

12. The system of claim 11, wherein the at least one property of the page record comprises at least one of (a) a paging-attempt status of the page record, (b) the wireless-communication device that is being paged.

13. A system configured to page a mobile station, the system comprising:

at least one communication interface configured to communicate with a wireless-communication device;

at least one processor; and program instructions stored in data storage and executable by the at least one processor to determine that the wireless-communication device should be paged and responsively:

use at least one property of a page record as a basis to select a paging-concatenation level for the page record, wherein the at least one property of the page record comprises the wireless-communication device that is being paged, and wherein selection of the paging concatenation level comprises: (a) determining a paging success rate (PSR) associated with the wireless-communication device that is being paged and (b) using the PSR as a basis for selecting the paging-concatenation level for the page record; and page the wireless-communication device by transmitting a page message that includes the page record, wherein the page message is of the selected paging-concatenation level;

wherein the system further comprises the PSR database in which the PSR data associated with each of a plurality of wireless-communication devices is stored.

14. The system of claim 13, wherein the wireless-communication device that is being paged is identified by at least one of (a) a device type of the wireless-communication device and (b) an identifier of the wireless-communication device as a basis to select the paging-concatenation level, and wherein the PSR data is stored in the PSR database on at least one of (a) a per-device type basis and (b) a per-identifier basis.

15. The system of claim 13, wherein the program instructions stored in data storage and executable by the at least one processor to determine the PSR comprise:

program instructions stored in data storage and executable by the at least one processor to determine a PSR class associated with the wireless-communication device.

* * * * *